April 12, 1960 J. E. GODWIN 2,932,435
LATCH MECHANISM FOR BOTTOM-DUMP BUCKET
Filed Sept. 9, 1957 2 Sheets-Sheet 1

INVENTOR
JAMES E. GODWIN
By: Donald G. Dalton
Attorney

April 12, 1960  J. E. GODWIN  2,932,435
LATCH MECHANISM FOR BOTTOM-DUMP BUCKET
Filed Sept. 9, 1957  2 Sheets-Sheet 2
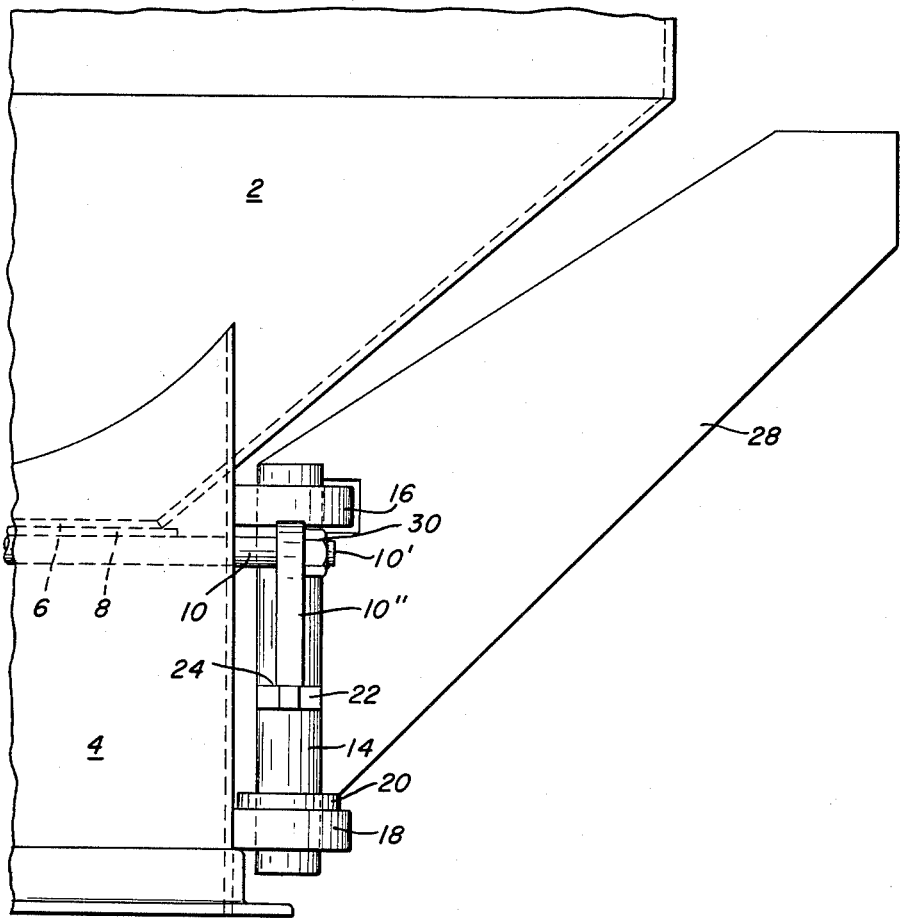
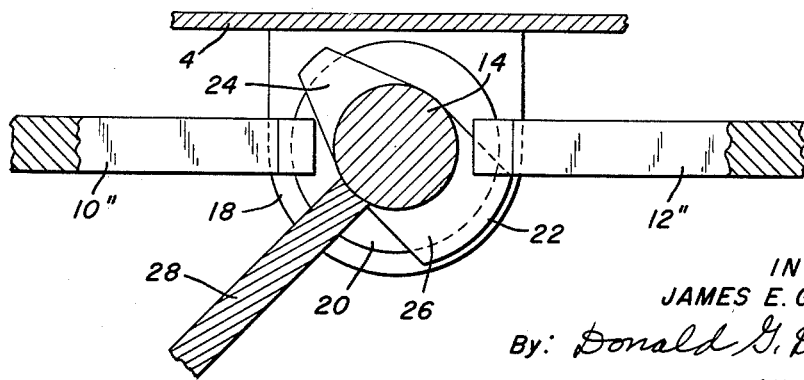
INVENTOR
JAMES E. GODWIN
By: Donald G. Dalton
Attorney

United States Patent Office 2,932,435
Patented Apr. 12, 1960

2,932,435
LATCH MECHANISM FOR BOTTOM-DUMP BUCKET

James E. Godwin, Monongahela, Pa., assignor to United States Steel Corporation, a corporation of New Jersey Application September 9, 1957, Serial No. 682,878

1 Claim. (Cl. 222—503)

The present invention relates to material-handling apparatus and has for its general object to provide an improved positive-action latch and tripping mechanism for a bottom-dump material-handling bucket.

As an example of one form which the invention may take, a coke breeze dispensing bucket, which is used for applying coke breeze to the bottom of an ingot soaking pit, constructed in accordance with the invention is described in the following specification and shown in the accompanying drawings; but it is to be understood that the invention may be embodied in other forms and that changes in the form described and shown may be made without exceeding the scope of the invention as defined in the appended claim.

Figure 1:
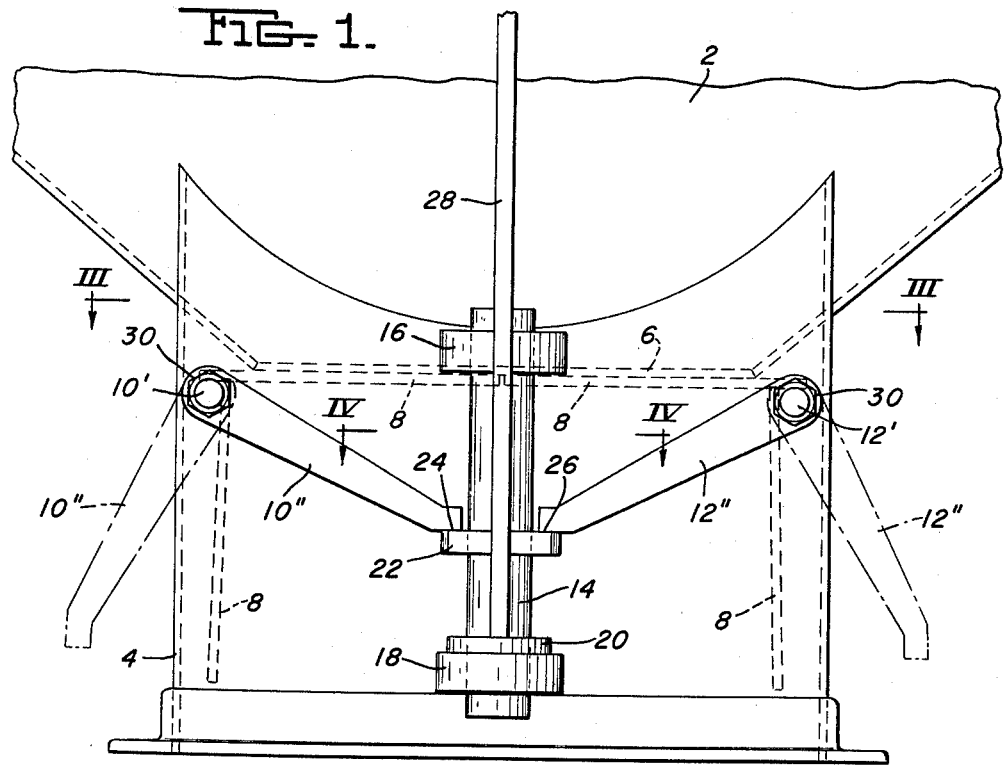
Figure 3:
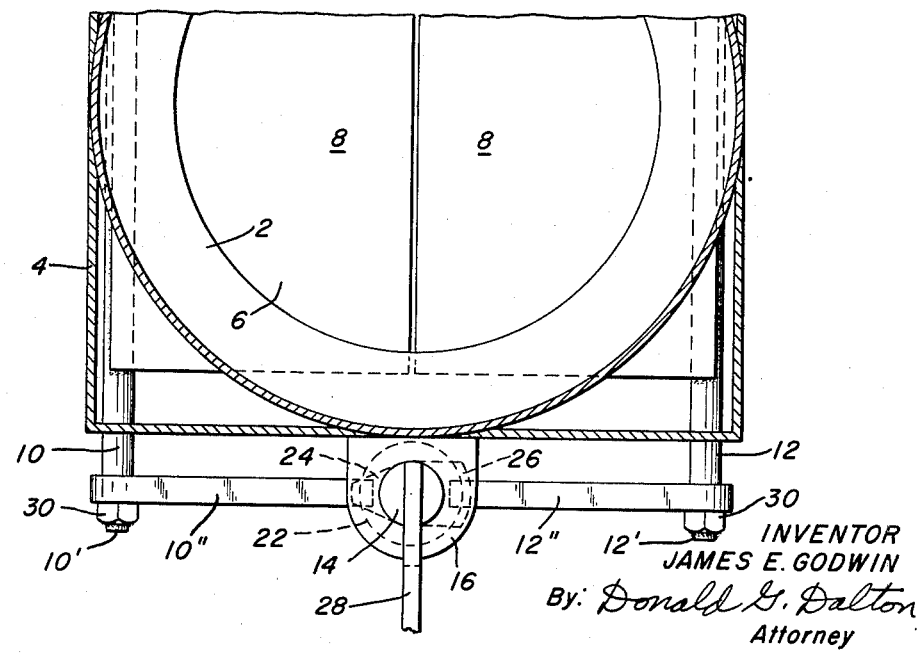

The above-stated and other objects will become more apparent after referring to the following specification and attached drawings, in which:

Figure 1 is a front elevational view;
Figure 2 is a side elevational view;
Figure 3 is a horizontal sectional view taken on the line III—III of Figure 1; and
Figure 4 is a sectional view taken on the line IV—IV of Figure 1 but showing the latch mechanism in an alternate position.

Referring more particularly to the drawings reference numeral 2 designates a coke breeze dispenser bucket having the latch mechanism of the invention installed thereon. The bucket 2 is provided with a spout 4 projecting from its underside which functions to guide coke breeze being dispensed from an opening 6 in the bottom of the bucket. A down tilting two-panel trap door 8 is pivotally disposed in the top of the spout 4 for closing the opening 6.

The panels of the trap door 8 are mounted in the spout by means of pivot shafts 10 and 12. End portions 10' and 12' of shafts 10 and 12, respectively, project from one side of the spout. Levers 10" and 12" are rigidly affixed on the projecting ends 10' and 12', respectively, whereby shafts 10 and 12 can be rotated to raise the panels of the trap door to close the opening 6.

The structure just described is conventional and is not claimed as part of my invention the details of which will now be described.

Reference numeral 14 designates a shaft journaled vertically on the outer surface of spout 4 between levers 10" and 12" in dead-eye bearings 16 and 18. A thrust collar 20 may be provided on the shaft 14 above the bottom bearing 18 to support the shaft in the bearing. Shaft 14 is freely rotatable in the bearings.

An eccentric lug or detent 22 projects radially from the shaft 14 for engaging the levers 10" and 12" to latch the trap door in closed position as best shown in Figure 1. Rotation of shaft 14 turns lug 22 away from under the levers when it is desired to cause down tilting or opening of the trap door. The lever engaging surface 24 of lug 22 on one side of shaft 14 is narrower than the lever engaging surface 26 of the lug on the other side of the shaft for a purpose which will become apparent as this description proceeds.

A wing member 28 is welded or otherwise rigidly attached to shaft 14 and extends radially therefrom. Wing member 28 functions as a handle for rotating shaft 14. When the mechanism of the invention is in latching position wing member 28 extends radially from the spout 4, as best shown in Figures 2 and 3.

In operation, the dispenser bucket, with trap door 8 closed is filled with coke breeze and then lowered into the soaking pit by means of an overhead crane (not shown). The crane operator spots the loaded dispenser bucket at the desired elevation and then rotates it either clockwise or counterclockwise (viewing it from above). As the bucket rotates the wing member 28 contacts the pit wall and is moved to the right or left, depending on the direction of rotation of the bucket. Movement of the wing member causes the shaft 14 and lug 22 to rotate and lug surfaces 24 and 26 to move out from under levers 10" and 12" thereby opening the trap door and releasing the coke breeze. The same result can be realized by moving the dispenser bucket in a straight line with the wing member 28 contacting the pit wall or other obstacle as desired, to close the trap door 8 and latch it in closed position, assuming that the wing member 28 has been moved to the left, the lever 12" is first lifted, by any suitable means such as a wrench (not shown) adapted to be applied to a hex nut 30 on the projecting end of shaft 12, to rotate shaft 12 and raise the panel attached thereto to closed position. After the panel on shaft 12 has thus been raised, the shaft 14 is pivoted by moving wing member 28 to the right as seen in Figure 4. This rotates lug 22 to the right and brings wide surface 26 of lug 22 into supporting position under lever 12". Then lever 10" is lifted to rotate shaft 10 and raise the panel attached thereto to closed position after which shaft 14 is further pivoted to the right a slight amount by moving wing 28 more to the right to position surface 24 of lug 22 under lever 10".

I have found it preferable to form lug 22 with surface 26 approximately three times as wide as surface 24. This permits moving surface 26 under lever 12" a sufficient distance to hold it up while surface 24 still remains out of the path of upward movement of lever 10".

While one embodiment of my invention has been shown and described, it will be apparent that other adaptations and modifications may be made without departing from the scope of the following claim.

I claim:

In a material-handling bottom-dump bucket having a two-panel trap door in the bottom thereof, a spout projecting from the bottom of said bucket, each of said panels being rigidly mounted on a pivotal shaft disposed in the top of said spout, each of said shafts having an end portion projecting from a common side of said spout, and levers affixed one to each of the projecting end portions of said shafts for pivoting the same the improvement therewith of a vertical shaft rotatably journaled on said common side of said spout between the free ends of said levers, a wing integral with said vertical shaft and projecting radially therefrom, and an eccentric lug on said vertical shaft intermediate its ends for engaging the free ends of said levers when said trap door is closed, said lug being adapted to disengage from said levers when said vertical shaft is rotated to open said trap door.

References Cited in the file of this patent
UNITED STATES PATENTS

| 2,482,516 | Sheesley | Sept. 20, 1949 |
| 2,638,062 | Zimmer | May 12, 1953 |
| 2,641,199 | Dorey | June 9, 1953 |
| 2,824,762 | Kaiser | Feb. 25, 1958 |

FOREIGN PATENTS

| 314,580 | Great Britain | July 1, 1929 |